(12) United States Patent
Neeb et al.

(10) Patent No.: US 6,544,245 B2
(45) Date of Patent: Apr. 8, 2003

(54) BI-STABLE FASTENING

(75) Inventors: Alexander J. Neeb, Alpharetta, GA (US); Richard J. Schmidt, Roswell, GA (US); Brian J. Vanbenschoten, Rochester, NH (US); William L. Huber, Epsom, NH (US); Wallace L. Kurtz, Jr., Lunenburg, MA (US); Ernesto S. Tachauer, Bedford, NH (US)

(73) Assignee: Velcro Industries B.V., Curacao (AN)

( * ) Notice: Subject to any disclaimer, the term of this patent is extended or adjusted under 35 U.S.C. 154(b) by 0 days.

(21) Appl. No.: 09/853,136

(22) Filed: May 10, 2001

(65) Prior Publication Data

US 2002/0169435 A1 Nov. 14, 2002

(51) Int. Cl.⁷ ................................................ A61F 13/15
(52) U.S. Cl. ........................ 604/391; 24/306; 24/442; 24/205; 24/2; 24/64; 24/580
(58) Field of Search ................ 604/391; 24/306, 24/442, 205, 2, 64, 580, 588

(56) References Cited

U.S. PATENT DOCUMENTS

| 3,247,559 | A |   | 4/1966  | Mathison |          |
|-----------|---|---|---------|----------|----------|
| 3,370,818 | A |   | 2/1968  | Perr     |          |
| 3,895,456 | A |   | 7/1975  | Fabre    | 46/30    |
| 3,899,805 | A |   | 8/1975  | McMillan | 24/213 B |
| 3,999,748 | A |   | 12/1976 | Clarke   | 273/95 R |
| 4,303,247 | A |   | 12/1981 | Fain     | 273/324  |
| 4,775,310 | A |   | 10/1988 | Fischer  | 425/308  |
| 4,840,339 | A |   | 6/1989  | Grogan   | 248/205.2|
| 4,870,725 | A |   | 10/1989 | Dubowik  | 24/442   |
| 4,887,338 | A | * | 12/1989 | Handler  | 24/306   |
| 4,946,527 | A |   | 8/1990  | Battrell | 156/60   |
| 5,097,570 | A |   | 3/1992  | Gershenson | 24/452 |
| 5,813,095 | A |   | 9/1998  | Robertson | 24/442  |
| 6,162,040 | A | * | 12/2000 | Clune    | 425/363  |
| 6,174,476 | B1|   | 1/2001  | Kennedy et al. | 264/167 |
| 6,202,260 | B1|   | 3/2001  | Clune et al. | 24/30.5 R |
| 2001/0038161 | A1 | * | 11/2001 | Kenney et al. | 264/167 |
| 2002/0037390 | A1 | * | 3/2002  | Sheoard et al. | 428/100 |
| 2002/0073517 | A1 | * | 6/2002  | Mizus    | 24/447   |

FOREIGN PATENT DOCUMENTS

| EP | 0812584 A2  | 12/1997 |
| WO | WO 00/18269 | 4/2000  |

* cited by examiner

Primary Examiner—William C. Doerrler
Assistant Examiner—Mark Shulman
(74) Attorney, Agent, or Firm—Fish & Richardson P.C.

(57) ABSTRACT

A bi-stable hook component of a touch fastener can bend into, and remain in, a stable concave position. Another stable position enables initial engagement with a mating component (e.g., a loop component). The concave position applies engagement-enhancing tension to the engaged loops, and in some cases forces end portions of the hooks into close proximity with one another to secure the fastening and to produce a curved touch fastener that, as engaged, can better conform to an underlying curved surface, such as the contour of a wearer's body. Absorbent articles having such a bi-stable fastening system are also disclosed.

23 Claims, 9 Drawing Sheets

BI-STABLE FASTENING

TECHNICAL FIELD

This invention is directed to touch fastening, and particularly to bi-stable touch fasteners (e.g., hook and loop fasteners) and articles incorporating such fasteners.

BACKGROUND

A number of fastening systems, such as diaper fastening systems, incorporate a hook and loop system for easy fastening and release. The hook component typically includes a flat plastic sheet laminate with a number of protruding hooks that engage with a number of loops protruding from a corresponding loop component. The flat hook backing remains essentially flat while undergoing engagement with the corresponding loop component. Such hook and loop fastening systems rely primarily on shear forces that resist unfastening. The force of the user allows the hooks to engage into corresponding loops, with little dimensional change in either the hook component or the loop component. More particularly, the hook component and the loop component tend to remain flat, or bent only about a single axis, throughout the engagement process.

Since the shear forces resist unfastening of the hook and loop fastening system, hook and loop components are typically separated from one another using peel forces. However, with little resistance to the peel forces, the hook and loop fastening system is susceptible to coming unfastened at unexpected, and often undesirable, times.

There is a need or desire for a hook and loop fastening system with improved fastening security.

SUMMARY

The present invention is directed to a touch fastening system with improved fastening security. The improved fastening security is attributable to a design that utilizes the forces used to apply a product and the three-dimensional geometry of corresponding hook components and loop components.

According to one aspect of the invention, a touch fastener comprises a hook component and a loop component, with each of the hook and loop components having exposed elements on an active side thereof for releasable engagement with the exposed elements of the other component. The active side of one of the hook and loop components has a surface that bi-stabilizes between a first stable form for initiating engagement with the active side of the other of the hook and loop components, and a stable, concave form for securing an initiated engagement of the other of the hook and loop components. The other of the hook and loop components has a flexible backing adapted to conform to the concave form of the one of the hook and loop components during engagement.

In some embodiments, the bi-stabilizing surface is inherently either semi-spherical or semi-ellipsoidal in its stable concave form.

In presently preferred forms, the exposed elements of the hook component comprise hooks, each hook having a free end with an engageable head. Preferably, the heads of at least two adjacent hooks are farther apart from one another when the bi-stabilizing surface is in its first stable form than when the bi-stabilizing surface is in its stable, concave form. Ideally, the heads of at least two adjacent hooks contact one another when the bi-stabilizing surface is in its stable, concave form.

The exposed elements of the hook component comprise, for some applications, mushroom-shaped hooks. These mushroom-shaped hooks may have flat upper surfaces, for example.

In some cases the bi-stabilizing surface is of the hook component.

According to another aspect, a touch fastener comprises a hook component and a loop component, with each of the hook and loop components having exposed elements on an active side thereof for releasable engagement with the exposed elements of the other component. The active side of one of the hook and loop components has a surface that bi-stabilizes between a first stable form for initiating engagement with the active side of the other of the hook and loop components, and a stable, concave form for securing an initiated engagement of the other of the hook and loop components. The exposed elements of the hook component comprise hooks, and the heads of at least two adjacent hooks contact one another when the bi-stabilizing surface is in its stable, concave form, to secure engaged loop component elements.

According to another aspect, a touch fastener comprises a pair of releasably engageable components, each of the components having exposed elements on an active side thereof for releasable engagement with the exposed elements of the other component. The active side of one of the components comprising a surface that bi-stabilizes between a first stable form for initiating engagement with the active side of the other of the components, and a stable, concave form for securing an initiated engagement of the other of the components. The exposed elements of at least one of the components comprise mushroom-shaped hooks.

In some preferred instances, the exposed elements of one of the components comprise fibers exposed for engagement by the hooks. In other cases, the exposed elements of both of the components comprise arrays of self-engageable mushroom-shaped hooks.

The above-described touch fastener systems are employed to advantage in various articles. In one aspect of the invention, an absorbent article (e.g., a diaper, a feminine hygiene product, or an incontinence product) has the featured touch fastener arranged to secure the absorbent article. Preferably, the touch fastener is arranged to extend over an underlying, curved surface of a wearer's body with the bi-stabilizing surface in its stable, concave form, for conforming the touch fastener to the wearer. In other aspects of the invention, the fastener system is provided on a training pant or medical garment.

According to yet another aspect of the invention, a method of releasably securing an article over an underlying curved surface is provided. The method includes grasping one of a pair of touch fastener components secured to the article, the grasped component having an active side comprising a surface that bi-stabilizes between a first stable form for initiating engagement with an active side of the other of the pair of touch fastener components, and a stable, concave form for securing an initiated engagement of the other of the touch fastener components. With the surface of the grasped component in its first stable form, an active side of the other component is contacted with the active side of the grasped component. With the active sides of the components in contact, the bi-stabilizing surface of the grasped component is forced or made to toggle to its stable, concave form to secure the components in engagement and to conform the grasped touch fastener component to the underlying curved surface.

In some instances, the article comprises a garment (e.g., a diaper) and the underlying curved surface is of a wearer's body.

According to yet other aspects of the invention, methods are provided for forming the bi-stable fastener products as herein described.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DEFINITIONS

Figure 1:
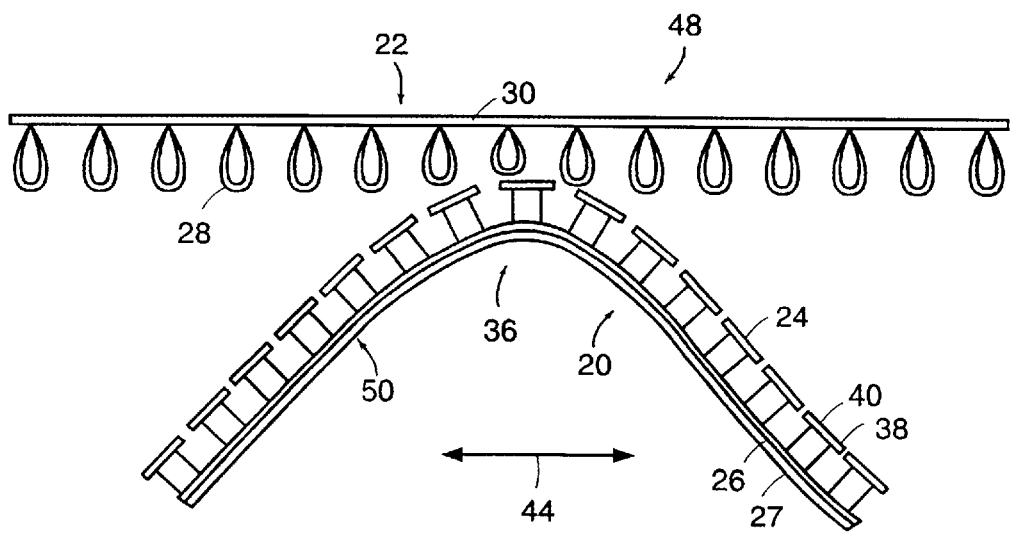
FIG. 1 is a side view of the components of a touch fastener as they are brought into initial engagement with the bi-stable hook component in a stable convex form.

Within the context of this specification, each term or phrase below will include the following meaning or meanings.

"Bi-stabilize" refers to the ability of an object to assume either of two stable forms, and the ability to alternate between these two forms through the application of force. By "stable form" we mean that once the form is obtained, the object will remain in that form unless acted upon by a force external to the object.

"Concave" and "convex" are used in their traditional sense, both requiring at least some curvature in both of two perpendicular planes normal to the surface at a common point. The curvature in each of the two planes does not have to be equal, and in some instances the ideal conformance with an underlying surface, or a particular bi-stability feature, may require the curvature in one of the planes to be relatively small (i.e., having a large radius of curvature) with respect to the curvature in the other orthogonal plane, such that the touch fastener substantially conforms to a surface with a fairly large radius of curvature.

"Flexible" refers to materials which are compliant and which will readily conform to the general shapes and contours of the objects in contact with the materials.

"Inherently curved surface" is a surface that is curved in a relaxed state, in the absence of an external biasing force.

"Inherently non-flat surface" is a surface that is non-flat in a relaxed state, in the absence of an external biasing force.

"Longitudinal" and "transverse" have their customary meaning, as indicated by the longitudinal and transverse axes depicted in FIGS. 1–9. The longitudinal axis lies in the plane of the article to which the fastening system is attached and is generally parallel to a vertical plane that bisects a standing wearer into left and right body halves when the article is worn. The transverse axis lies in the plane of the article generally perpendicular to the longitudinal axis.

"Peel force" refers to a force that tends to pull two adjoining bodies away from one another in opposite directions generally perpendicular to a plane in which the bodies are joined.

"Personal care garment," as used herein, includes diapers, training pants, swim wear, absorbent underpants, adult incontinence products, feminine hygiene products, medical garments, and the like. The term "medical garment" includes medical (i.e., protective and/or surgical) gowns, caps, gloves, drapes, face masks, blood pressure cuffs, bandages, veterinary products, mortuary products, and the like.

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

"Releasably attached," "releasably engaged" and variations thereof refer to two elements being connected or connectable such that the elements tend to remain connected absent a separation force applied to one or both of the elements, and the elements being capable of separation without substantial permanent deformation or rupture. The required separation force is typically beyond that encountered while wearing the absorbent garment.

"Shear force" refers to forces that tend to produce an opposite but parallel sliding motion between two bodies' planes.

"Thermoplastic" describes a material that softens when exposed to heat and which substantially returns to a non-softened condition when cooled to room temperature.

These terms may be defined with additional language in the remaining portions of the specification.

DETAILED DESCRIPTION

Figure 2:
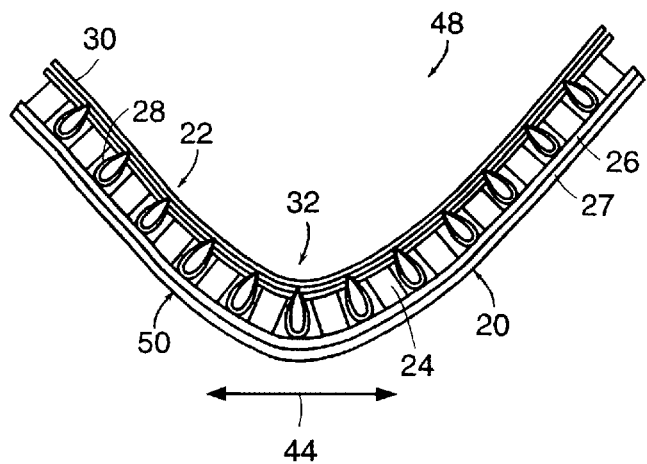
FIG. 2 is a side view of the touch fastener subsequent to full engagement, with the bi-stable hook component assuming its stable, concave form.

FIGS. 1 and 2 illustrate a hook-and-loop fastening system 48 that utilizes the three-dimensional geometry of the hook and loop components, as well as the forces employed to apply a product to a wearer, for increased security. This hook and loop fastening system 48 is particularly suitable for use on disposable absorbent articles, such as diapers, training pants, feminine hygiene products, incontinence products, other personal care or health care garments, including medical garments, or the like.

Hook component 20 and loop component 22 can be brought together to be releasably attached, or releasably engaged, to one another. The hook component 20 has a number of individual hooks 24 protruding generally perpendicularly from a flexible hook backing material 26. A semi-rigid layer 27 is attached to the flexible hook backing 26 to enable stable convex (FIG. 1) and concave (FIG. 2) conformations of the surface of the hook component 20 from which hooks 24 extend. Similarly, loop component 22 has a number of individual loops 28 protruding generally perpendicularly from a flexible loop backing material 30. Upon initial contact with the hook component in convex form (FIG. 1), some of the individual hooks 24 and loops 28 are brought into engagement. When the hook component is subsequently snapped to its concave position 32, this engagement is augmented and additional hooks and loops are engaged to increase the strength of the fastening. As the hook component is moved to its concave stable form, the lateral spacing between the engageable heads of adjacent hooks is reduced, helping to entrap the engaged loops or fibers. Tension in the engaged fibers is also increased as hook component 20 forces the deflection of the base of loop component 22 by pulling on its loops. This tension can also help to secure the fastening.

The force required to separate the engaged hooks 24 and loops 28 can be reduced, when desired, by bending the hook backing material 26 out of the concave position 32 (FIG. 2) into a flat position 34 (FIG. 3) or a convex position 36 (FIG. 1).

Figure 3:
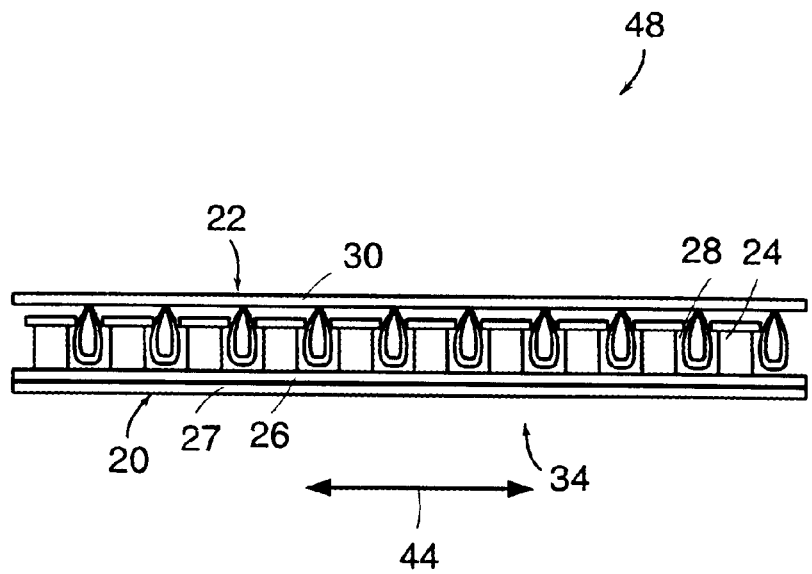
FIG. 3 is a side view of a touch fastener in a flat position, with a hook component engaged with a loop component.
Figure 6:
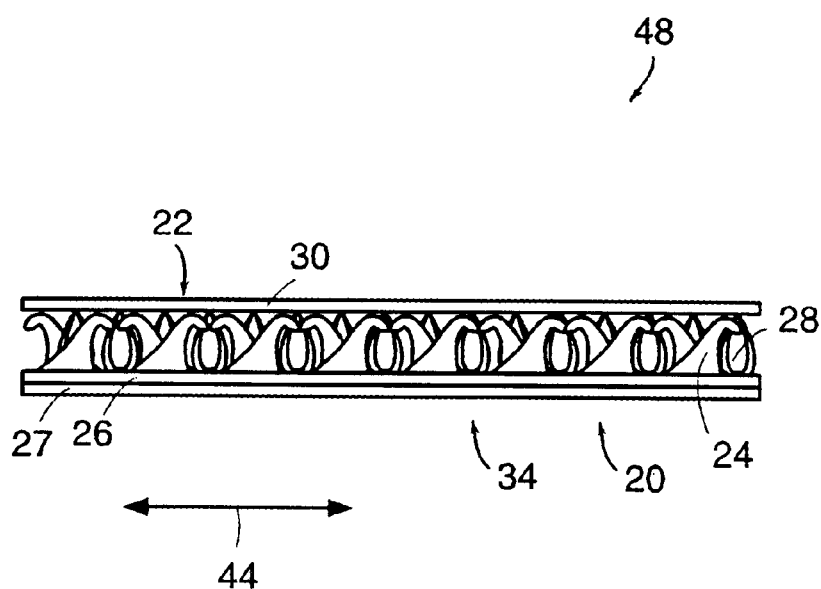
FIGS. 4–6 correspond to FIGS. 1–3, respectively, but illustrating a second embodiment of hook fastener.
Figure 4:
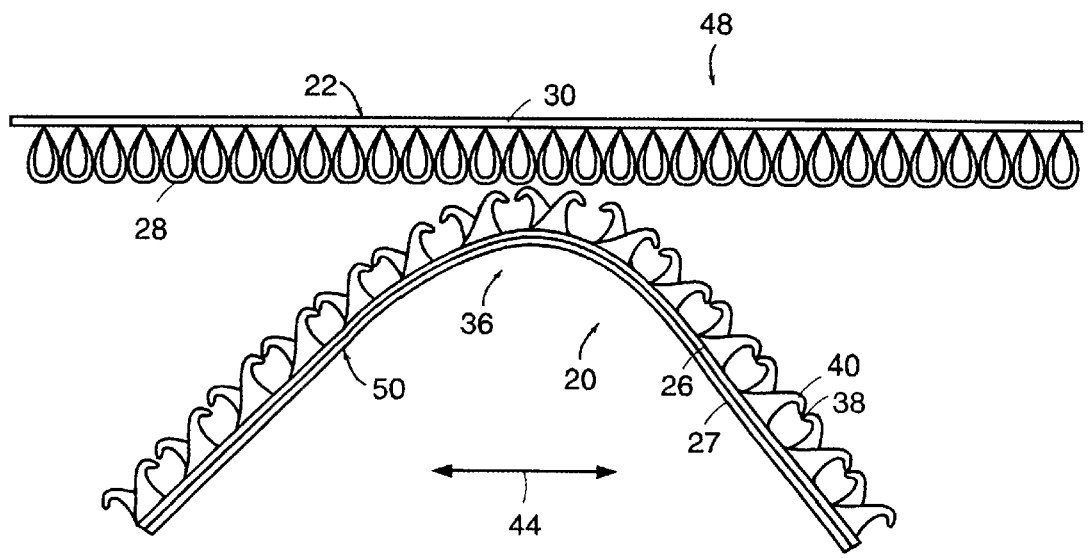
Figure 5:
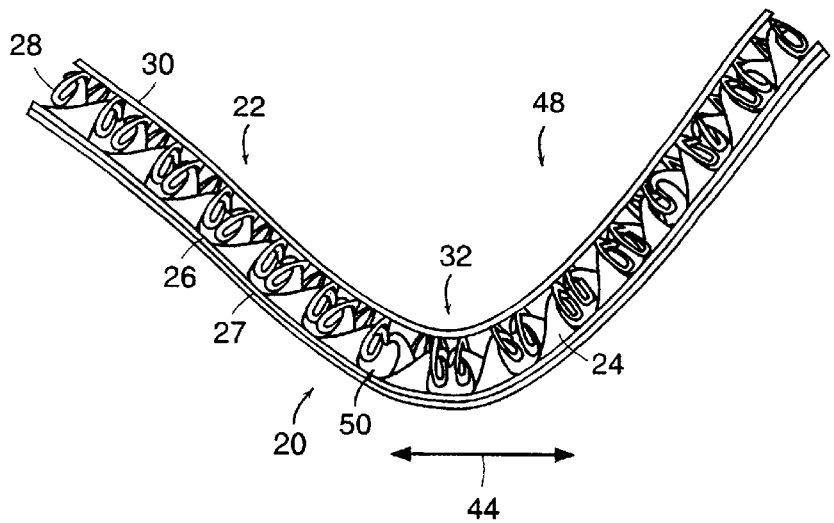
Figure 7:
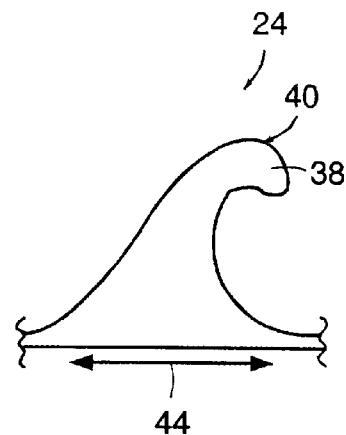
FIG. 7 is a side view of an individual, J-shaped hook of a hook component.
Figure 8:
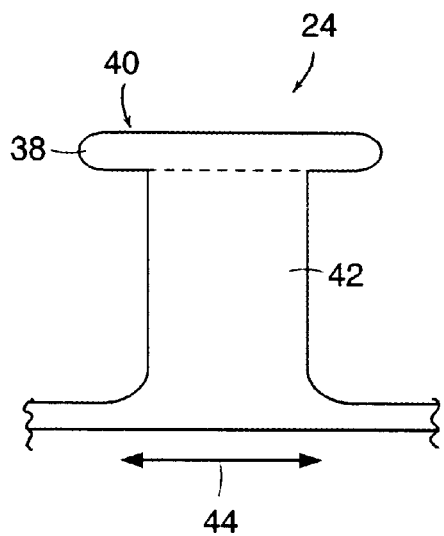
FIGS. 8 and 9 are side and front views, respectively, of an individual, mushroom-shaped hook having a head with a flat upper surface.
Figure 9:
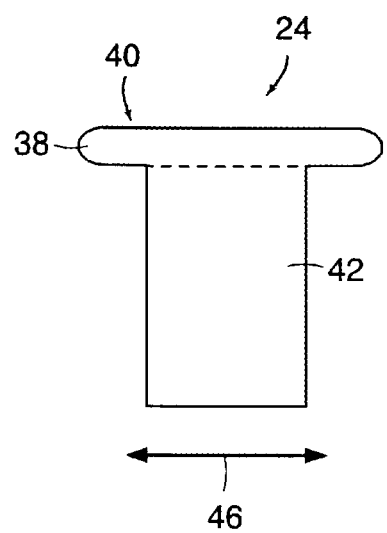

FIGS. 4–6 show a hook component 20 having J-shaped hooks 24 rather than the mushroom-shaped hooks 24 shown in FIGS. 1–3. The hook component 20 having J-shaped hooks 24 can be engaged with and separated from the loop component 20 in the same manner as the hook component 20 having mushroom-shaped hooks 24. Virtually any hook shape can be used with the hook component 20 of this invention. Suitably, the individual hooks 24 have an engageable head 38 at a free end 40 of each hook 24. The head 38 can be flat (FIGS. 1–3, 8 and 9), rounded (FIGS. 4–7), or any other suitable shape. The mushroom-shaped hook 24 shown here has a circular head 38 with a flat top and can look the same in the transverse direction (FIG. 8) as in the longitudinal direction (FIG. 9), in which case the stem 42 of the hook 24 is suitably round or square as viewed from above. Alternatively, the stem 42 of the hook 24 can be oblong, rectangular, triangular, or any other suitable shape. One example of a mushroom-shaped hook is CFM 60-1002 (0.06) available from Velcro USA of Manchester, N.H. This particular hook component 20 has an array of hooks 24 protruding from the backing 26, with the hooks 24 lined up in two directions to form rows. The longitudinal direction is indicated by an arrow 44 in FIGS. 1–8. The term "transverse direction" refers to a direction perpendicular to the longitudinal direction. The transverse direction is indicated by an arrow 46 in FIG. 9. In many diaper fasteners, the transverse direction of the hook fastening component is typically aligned parallel to the wearer's waistline, with the longitudinal direction of the fastening component parallel to the wearer's backbone. The hooks 24 can be organized into other geometries to optimize engagement with available loops 28.

As used herein, the terms "convex" and "concave" are used with respect to the side of the hook component 20 from which the hooks 24 protrude. When the hook component 20 is in the fastened, concave position 32, the concavity of the hook component 20 ideally curves to fit comfortably about a curvature of the wearer's body at the location of the hook component 20.

The individual loops 28 of the loop component 22 can be needled, stitched or otherwise connected to or projected through the loop backing material 30, which can suitably be made from a non-woven material. The individual loops 28 thus connected can be made of yarn or tow. Once the loops 28 have been formed, fibers forming the loops 28 can be anchored in place by bonding the fibers to the loop backing material 30 with heat and/or adhesives or any other suitable means. Such suitable loop components 22 are also available from Velcro USA of Manchester, N.H. The individual loops 28 can alternatively be formed as an integral part of a fibrous non-woven web such as a spunbond non-woven web or a staple fiber carded web. These non-woven webs can be creped or crimped using processes known in the art, to form well-defined loop regions within their fiber structures. Another suitable type of material for making the loop component 22 is "point unbonded" material. Point unbonded materials are fabrics having continuous thermally bonded areas defining a plurality of discrete unbonded areas and are described in greater detail in U.S. Pat. No. 5,858,515 to Stokes, et al.

Figure 10:
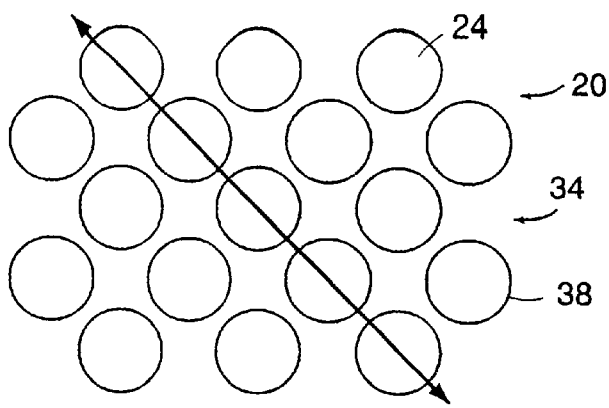
FIGS. 10 through 12 are top views of an array of mushroom-shaped hooks of a bi-stable hook component, with the hook component in flat, convex, and concave form, respectively.
Figure 11:
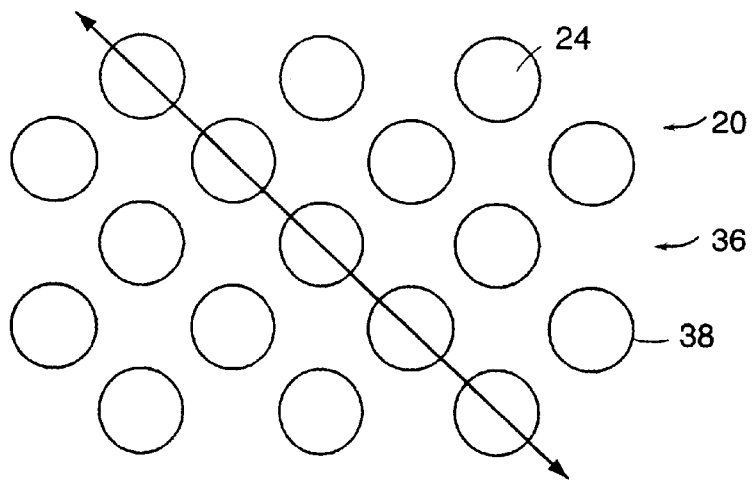

The hook backing 26 includes semi-rigid layer 27, to create enhanced fastening security. FIG. 10 shows a top view of a plurality of mushroom-shaped hooks 24 on the hook backing 26 with the hook backing 26 in a flat position 34. FIG. 11 shows a top view of the same mushroom-shaped hooks 24 with the hook backing 26 in a convex position 36 (see also FIG. 1). When the hook backing 26 is in the convex position 36 as shown, the heads 38 of the hooks 24 are a greater distance apart from one another than when the hook backing 26 is either flat or concave. When the hook backing 26 is in the convex position 36, the loops 28 of the loop component 22 can more readily engage the hooks 24 because of this increased spacing.

Figure 12:
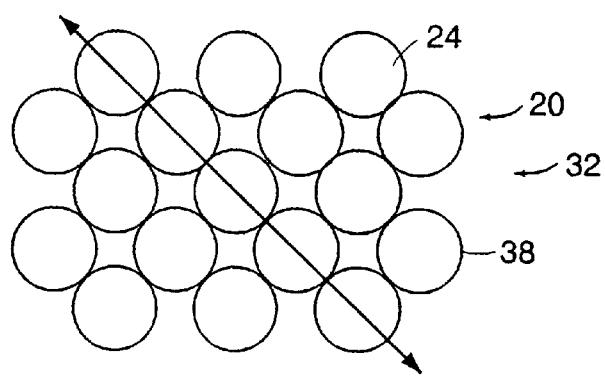

Once the loops 28 are inserted between the hooks 24, the hook backing 26 can be bent, or snapped, into a concave position 32 to engage the hooks 24. A top view of the position of the hooks 24 on the concave hook backing 26 is shown in FIG. 12. As can be seen in FIGS. 2 and 12, when the hook backing 26 is in the concave position 32 the heads 38 of the hooks 24 are closer to one another than when the hook backing 26 is in its unstable flat or stable convex form. Suitably, in the concave position 32 the heads 38 of adjacent hooks 24 contact one another, thereby fully trapping the loops 28 between adjacent hooks 24. The hook backing 26 is flexible, yet contains enough rigidity to maintain a concave shape until a user forces the hook backing 26 into its convex shape.

A reasonable amount of energy is required to "snap" the hook backing 26 into a convex 36 or a concave position 32. The amount of energy required should be small enough to enable a typical user to overcome the internal stabilizing forces of the backing 26 without over-exertion, yet large enough to avoid unintentional form transition due to forces applied to the fastener during normal use, such as the forces exerted on a diaper fastener, for example, during infant wear. Preferably, the force required to toggle the hook backing 26 should be of similar magnitude to the force required to toggle a common light switch.

In the illustrated embodiment of FIGS. 1 and 2, the hook backing 26 has an inherently curved surface 50 (such as an inherently partial spherical or ellipsoidal surface) and can assume either a stable concave position 32 or a stable convex position 36 but will not assume any other state (e.g., a flat state) without maintained force. In another example (not shown), a bi-stable hook backing can be toggled between a flat stable position. (as in FIG. 3) and a stable concave position (as in FIG. 2).

The semi-rigid layer 27 can either be a separate layer attached to the hook backing 26 or can serve as the entire hook backing 26 from which the hooks 24 protrude. For example, the semi-rigid layer 27 of FIGS. 1 and 2 forms a partial spherical or ellipsoidal surface 50. Suitable materials for the semi-rigid layer 27, or semi-rigid hook backing 26, include metals, laminates, and/or thermoplastic polymers selected from polyamides, polyesters, polyolefins (e.g. polypropylene or polyethylene) or another suitable material. Spring steel tape, for example, may be heat-treated to display a bi-stable nature and then either embedded in, or attached to, hook backing 26. If the hooks 24 are co-formed with a flexible hook backing 26, or are otherwise adhered to a flexible hook backing 26, the flexible hook backing 26 can be bonded to the semi-rigid layer 27, such as a semi-rigid partial spherical or ellipsoidal surface 50, or any three-dimensionally shaped surface that can be formed from a flat material, to enable the hook component 20 to bend and remain in the concave 32 or convex position 36. The semi-rigid layer 27 can be either continuous or non-continuous, such that the semi-rigid layer 27 can cover an entire surface of the hook component 20, or merely a center portion of the hook component 20, or merely a border portion of the hook component 20, or any other suitable portion of the hook component 20.

Preferable hook components 20 generally have between about 16 and about 620 hooks per square centimeter, more preferably between about 124 and about 388 hooks per square centimeter, and desirably between about 155 and about 310 hooks per square centimeter. The hooks 24 suitably have a height of from about 0.00254 centimeter (cm) to about 0.19 cm, preferably from about 0.0381 cm to about 0.0762 cm. The hooks may be molded or extruded from a thermoplastic polymer selected from polyamides, polyesters, polyolefins (e.g. polypropylene or polyethylene) or another suitable material. Likewise, the hook backing material 26, not including the semi-rigid material, can be made of any of these or any other suitable materials since the hooks 24 and the hook backing 26 are generally produced from the same material in one process, such as the continuous molding method taught by Fischer in U.S. Pat. No. 4,794,028, hereby incorporated by reference. The hook backing material 26 generally has a thickness in a range of between about 0.5 millimeter (mm) and about 5 mm, preferably in a range of between about 0.8 mm and 3 mm, with the combined backing and hooks having a basis weight in a range of from about 20 grams per square meter to about 70 grams per square meter. The hooks 24 are spatially arranged in rows or any other suitable configuration on the hook backing 26.

Figure 13:
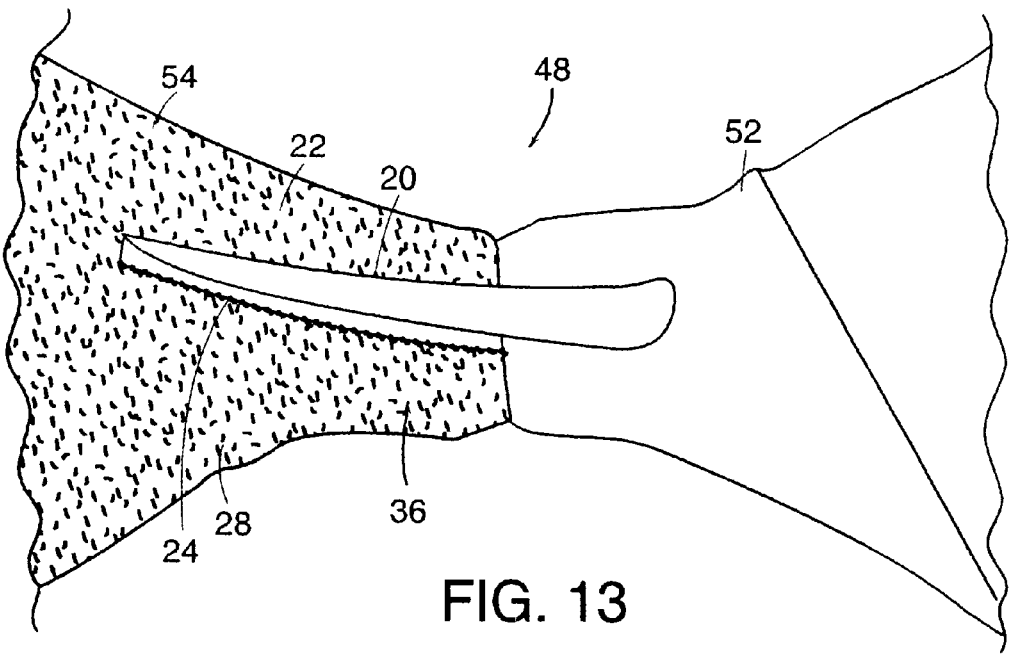
FIG. 13 illustrates a bi-stable hook component during initial engagement with a loop component on a disposable diaper, with the hook component in a stable, convex position.
Figure 14:
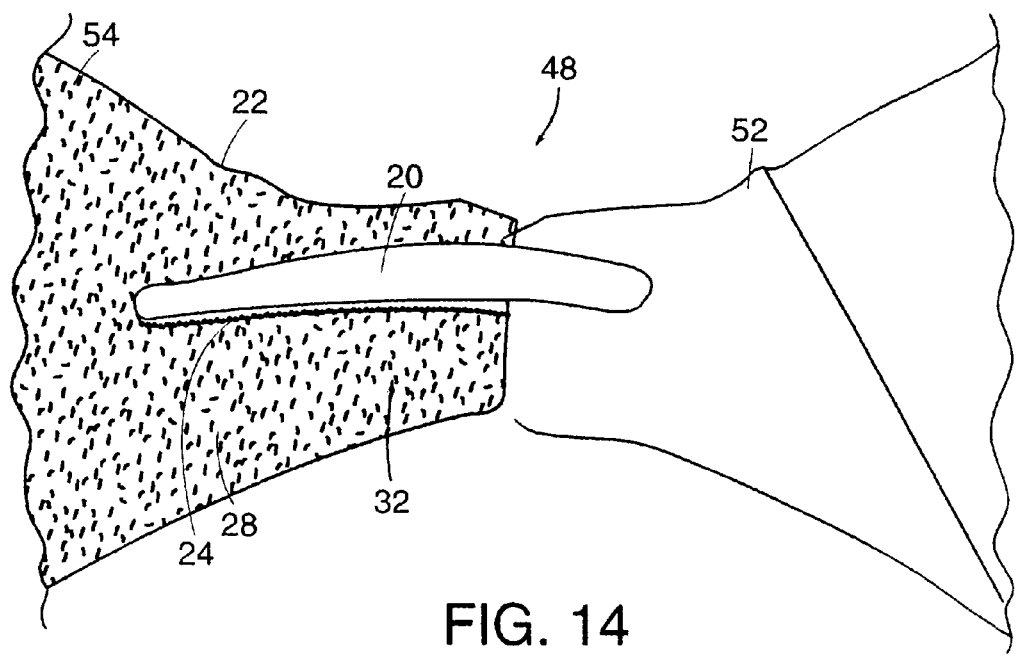
FIG. 14 shows the diaper fastener of FIG. 13 after engagement, with the hook component in a stable, concave position.

When fastening system 48 is employed on an absorbent article, such as a diaper, for example, the hook component 20 is attached to a first portion 52 of the article and the loop component 22 is attached to a second portion 54 of the article. Alternatively, the loop component 22 can cover an entire surface of the article, with the hook component 20 attached to only a portion of the article. As shown in FIG. 13, prior to fastening the loop component 22 and the hook component 20, the hook component 20 is in its stable convex form 36. As shown in FIG. 14, when the hook component 20 and the loop component 22 are fastened, the hook component 20 is in the concave state 32, which helps to contour the fastening system to the shape of the wearer's body.

Thus, fastening system 48 employs energy supplied by a user to manipulate the form of the fastener to engage and trap loops 28 of the loop component 22 among the hooks 24 of the hook component 20. The result is a three-dimensional fastening system 48 that improves fastening security and can also be optimized to conform to a wearer.

The hook component 20 can bend into a partial spherical surface, such that the hook heads radially expand or contract into convex and concave modes, accordingly. The hooks 24 can be flat-top hooks, J-shaped hooks, or any other suitably shaped hooks. In the illustrated system, the hook component is supported with a backing that forces the hook component to be in either the convex or the concave mode, but does not allow the hook component to assume a flat state once engaged. This system requires a reasonable amount of energy to snap from concave to convex, and vice-versa.

The touch fastener components are attached to, for example, a diaper. The consumer receives the diaper (or other product having the above-described hook and loop fastening system), with the bi-stabilizing component in the convex state with respect to its active side. The consumer presses the bi-stabilizing component to the active surface of the other component with enough force to "snap" the stiff backing of the bi-stabilizing component into its concave state. As this happens, the fastener elements of the other component (e.g., loops or fibers) bypass the engaging heads of the fastener elements of the other component (e.g., hooks) to be trapped or ensnared once the bi-stabilizing component is snapped into the concave state, resulting in improved fastening performance over some conventional systems.

Figure 15:
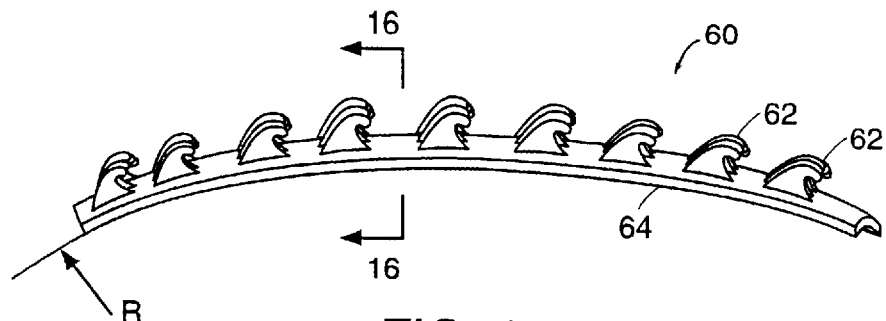
FIG. 15 is a side view of another bi-stable hook component.

FIG. 15 illustrates a length of bi-stable male fastener component tape 60 with hook-shaped fastener elements 62 integrally molded with a surface of a common, curved, sheet-form base 64. As shown, base 64 has curvature in two orthogonal planes. First, it defines a relatively large radius of curvature "R" about an axis perpendicular to the figure, and locally defines at each point along its length a relatively small radius of curvature "r" about an axis extending along its length (see also FIG. 16A, for example). The hook-shaped fastener elements 62 are molded in rows extending along the length of the tape. The fastener elements may be molded to face in the same direction, as shown, or in opposite directions along alternating rows.

As shown in cross-sectional views 16A–16C, various embodiments of hook tape 60 have different structures of base 64 to result in its bi-stable nature. Referring first to FIG. 16A, for example, base 64 is a lamination of two different materials. The upper surface 66 of the base is formed of the same resin as the hook-shaped fastener elements 62, as integrally molded. The underside 68 of the base, however, is formed of a second material, such as another polymer resin with different physical properties than the material forming the upper surface of the base and the hooking elements. In such case, the resin of underside 68 is preferably a relatively rigid resin, such as polyvinyl chloride. The underside resin can be made substantially more rigid than the upper surface resin by selectively cross-linking the underside resin after molding, for example. Alternatively, the material of underside 68 can be a pre-formed material of relatively stiff structure and exhibiting shape memory, such as a strip of spring steel, that is laminated to the upper base resin, either during hook molding or afterward.

Figure 16B:
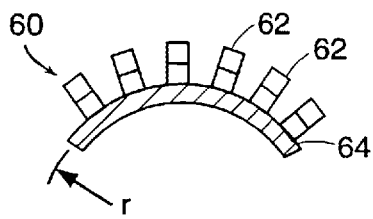
FIGS. 16A–16C are alternative cross-sections of the hook component of FIG. 15, taken along line 16—16 in FIG. 15.
Figure 16A:
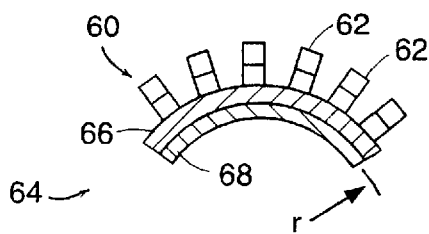

In another embodiment shown in FIG. 16B, base 64 consists of a single layer of resin integrally molded with hook elements 62. Subsequent to molding, base 64 is rigidified, such as by selective cross-linking from below, as it is permanently deformed to have its dual-curved form.

Figure 16C:
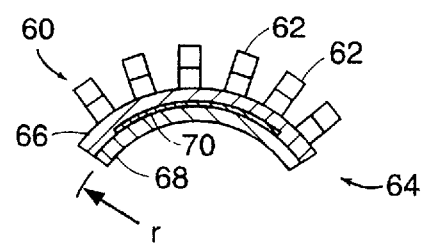

In the embodiment of FIG. 16C, a thin strip 70 of pre-curved metal, such as spring steel as employed in common, coiled measuring tape, is encapsulated between upper surface resin 66 and lower surface resin 68 as the hook elements are molded. By keeping the molding temperature below the annealing temperature of the metal strip, but high enough to cause some permanent curling of the metal strip along its length, the hook tape exhibits bi-stable properties as molded.

Figure 17:
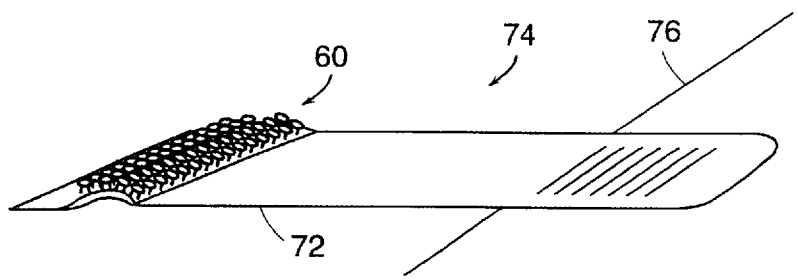
FIG. 17 shows the hook component of FIG. 15 incorporated into a diaper tab.

The hook tape 60 of FIG. 15 can further be laminated to a substrate 72 to form a diaper tab 74, as shown in FIG. 17. (As illustrated in FIG. 17, the hook tape 60 has mushroom-type fastener elements, but is otherwise as shown in FIG. 15). One end of tab 74 is permanently secured to a diaper 76, as is known in the art, with hook tape 60 extending across the free end of the tab for engaging a patch of loop material (not shown) to hold the diaper in place. Similar applications include closures for other types of personal care products, garments and the like.

Figure 18A:
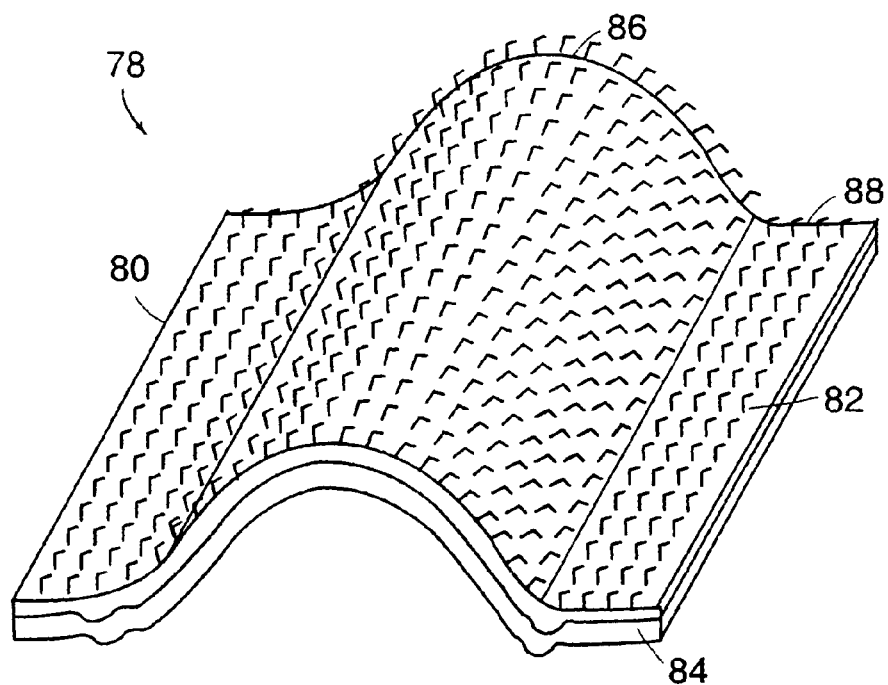
FIGS. 18A and 18B show another bi-stable hook component in stable convex and stable concave position, respectively.
Figure 18B:
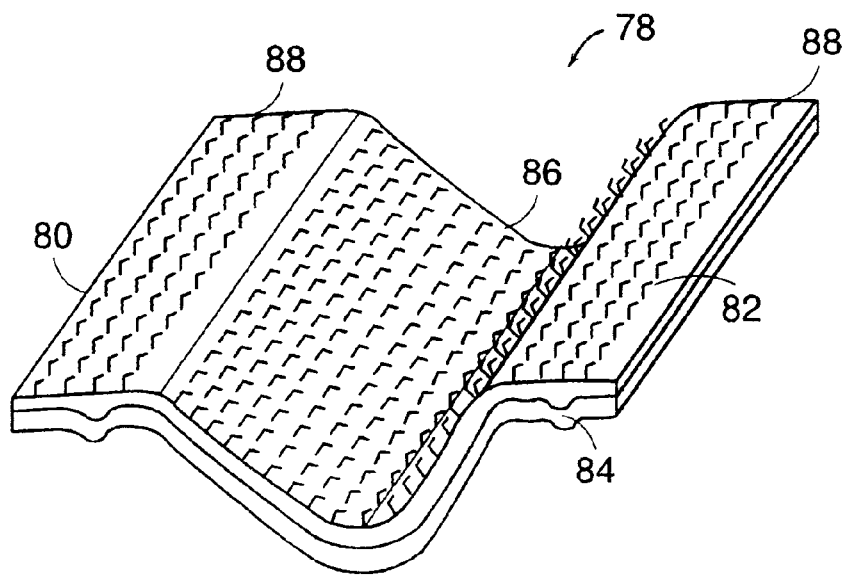

The hook component 78 of FIGS. 18A and 18B has a base 80 consisting of an upper surface 82 of resin integrally molded with hook elements 62, and a lower surface formed by a metal strip 84 laminated to the resin. Both the resin surface 82 and metal strip 84 are creased along either edge of a convex bi-stable region 86 (convex from the perspective of the hooking side) to form two side flanges 88 covered with exposed hooks but curved only about a single axis. Flanges 88 may be permanently secured to a substrate, for example, while leaving bi-stable region free to be flexed between its stable convex (FIG. 18A) and concave (FIG. 18B) positions without unduly binding the substrate.

Figure 19:
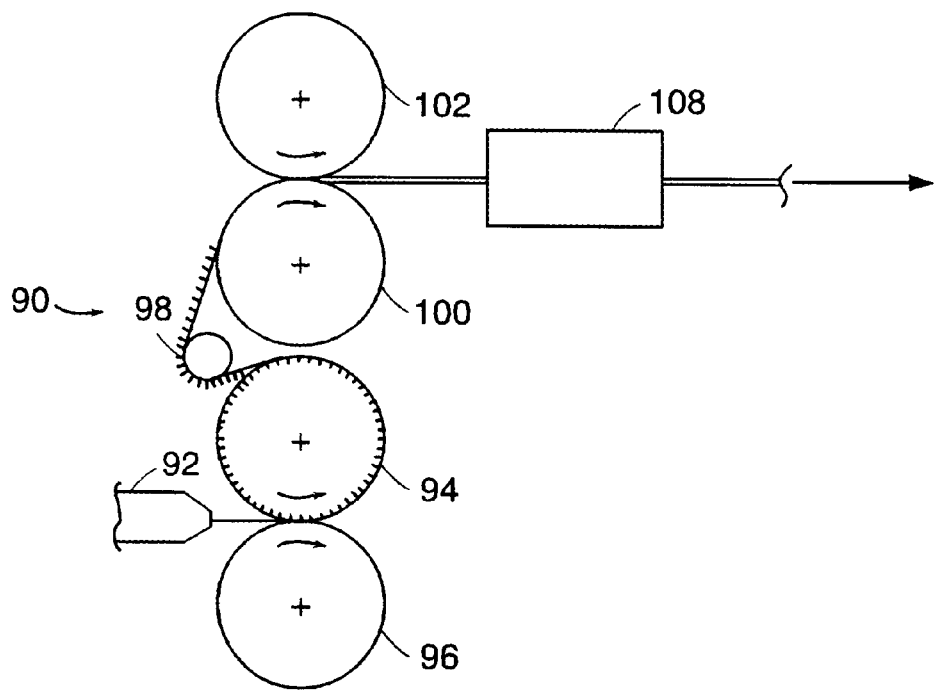
FIG. 19 schematically illustrates a method and apparatus for forming bi-stable hook component tape.

Referring now to FIG. 19, apparatus 90 for molding bi-stable hook tape includes an extruder 92 that provides a sheet of molten resin to a nip between a rotating mold roll 94 and a pressure roll 96, such that some of the resin is forced into blind mold cavities of mold roll 94 to form hook-shaped fastener elements connected by a planar sheet of the resin cooled on the surface of the mold roll. After the resin is sufficiently cooled, the planar base and integrally molded fastener elements are stripped from the mold roll by passing the molded strip about a take-off roll 98. More details of extruder 92, mold roll 94 and pressure roll 96 can be found in U.S. Pat. No. 4,794,028 to Fischer. From take-off roll 98, the molded hook tape is passed between two heated forming rolls 100 and 102 (see also FIG. 20) to form parallel bands of hook tape with cross-machine radius of curvature "r". Extruder 92 can be adapted to supply two flows of resin to the molding nip, such as for molding the structures shown in FIGS. 16A and 16C. Embodiments containing metal strips in their bases can be formed by introducing the metal strip to the resin in the molding nip, in an in-situ lamination process such as is taught by Kennedy et al. in U.S. Pat. No. 5,260,015, the entire contents of which are also incorporated herein by reference.

Figure 20:
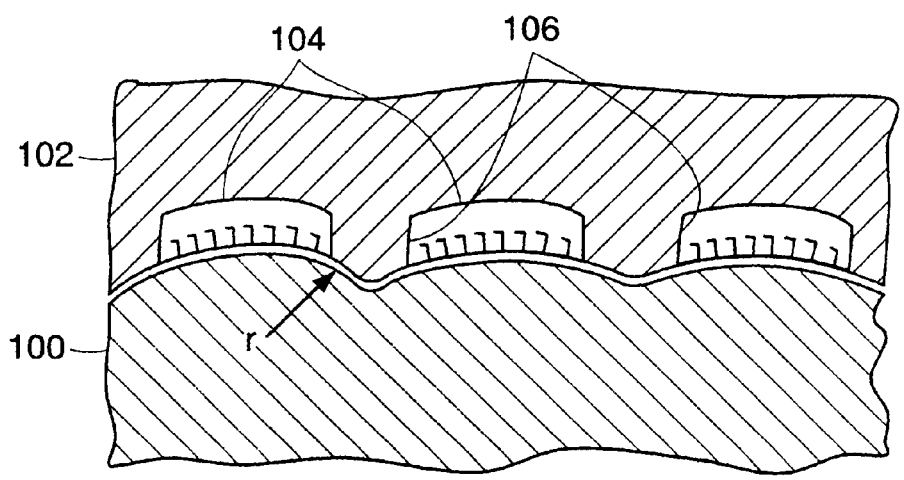
FIG. 20 is a cross-sectional view, taken along line 20—20 in FIG. 19.

As shown in FIG. 20, rolls 100 and 102 have mating, pleated outer surfaces, with the outer surface of roll 102 defining a series of hook-relief grooves 104 separated by base-engaging ribs 106 that force the base of the resin down into corresponding depressions in roll 100 to laterally stretch the base of the hook tape across the curved pleats of roll 100. This curvature is either set while the hook tape is on roll 100, or immediately after leaving roll 100, such as in a cross-linking curvature setting station. By varying the temperature, speed, tape tension, and other parameters of this curvature-inducing process, both longitudinal and cross-machine curvature can be permanently created in the hook tape. Optimization of the process parameters will be different for each hook tape material and structure.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A touch fastener comprising a hook component and a loop component, each of the hook and loop components having exposed elements on an active side thereof for releasable engagement with the exposed elements of the other component;

the active side of one of the hook and loop components comprising a surface with unrestrained edges that bi-stabilizes between a first stable form for initiating engagement with the active side of the other of the hook and loop components, and a stable, concave form for securing an initiated engagement of the other of the hook and loop components, wherein the other of the hook and loop components has a flexible backing adapted to conform to the concave form of said one of the hook and loop components during engagement.

2. The touch fastener of claim 1, wherein the bi-stabilizing surface is inherently semi-spherical in its stable concave form.

3. The touch fastener of claim 1, wherein the bi-stabilizing surface is inherently semi-ellipsoidal in its stable concave form.

4. The touch fastener of claim 1, wherein the exposed elements of the hook component comprise hooks, each hook having a free end with an engageable head.

5. The touch fastener of claim 4, wherein the heads of at least two adjacent hooks are farther apart from one another when the bi-stabilizing surface is in its first stable form than when the bi-stabilizing surface is in its stable, concave form.

6. The touch fastener of claim 4, wherein the heads of at least two adjacent hooks contact one another when the bi-stabilizing surface is in its stable, concave form.

7. The touch fastener of claim 1, wherein the exposed elements of the hook component comprise mushroom-shaped hooks.

8. The touch fastener of claim 7, wherein the heads of the hooks have flat upper surfaces.

9. The touch fastener of claim 1, wherein the bi-stabilizing surface is of the hook component.

10. An absorbent article comprising the touch fastener of claim 1 arranged to secure the absorbent article.

11. The absorbent article of claim 10 comprising a diaper.

12. The absorbent article of claim 10 comprising a feminine hygiene product.

13. The absorbent article of claim 10 comprising an incontinence product.

14. The absorbent article of claim 10 wherein the touch fastener is arranged to extend over an underlying, curved surface of a wearer's body with the bi-stabilizing surface in its stable, concave form, for conforming the touch fastener to the wearer.

15. A training pant comprising the touch fastener of claim 1 arranged to secure the training pant.

16. A medical garment comprising the touch fastener of claim 1 arranged to secure the medical garment.

17. A touch fastener comprising a hook component and a loop component, each of the hook and loop components having exposed elements on an active side thereof for releasable engagement with the exposed elements of the other component;

the active side of one of the hook and loop components comprising a surface that bi-stabilizes between a first stable form for initiating engagement with the active side of the other of the hook and loop components, and a stable, concave form for securing an initiated engagement of the other of the hook and loop components, wherein the exposed elements of the hook component comprise hooks, and the heads of at least two adjacent hooks contact one another when the bi-stabilizing surface is in its stable, concave form, to secure engaged loop component elements.

18. The touch fastener of claim 17, wherein the hooks are mushroom-shaped.

19. A touch fastener comprising a pair of releasably engageable components, each of the components having exposed elements on an active side thereof for releasable engagement with the exposed elements of the other component;

the active side of one of the components comprising a surface that bi-stabilizes between a first stable form for initiating engagement with the active side of the other of the components, and a stable, concave form for securing an initiated engagement of the other of the components, wherein the exposed elements of one of the components comprise mushroom-shaped hooks each having a head wherein the heads of at least two adjacent hooks contact one another when the bi-stabilizing surface is in its stable, concave form, and wherein the exposed elements of the other component comprise fibers exposed for engagement by the hooks to secure engagement between the pair of component elements.

20. The touch fastener of claim 19 wherein the exposed elements of one of the components comprise fibers exposed for engagement by the hooks.

21. A method of releasably securing an article over an underlying curved surface, the method comprising grasping one of a pair of touch fastener components secured to the article, the grasped component having an active side comprising a surface with unrestrained edges that bi-stabilizes between a first stable form for initiating engagement with an active side of the other of the pair of touch fastener components, and a stable, concave form for securing an initiated engagement of the other of the touch fastener components;

with the surface of the grasped component in its first stable form, contacting an active side of the other component with the active side of the grasped component; and with the active sides of the components in contact, forcing the bi-stabilizing surface of the grasped component to toggle to its stable, concave form to secure the components in engagement and to conform the grasped touch fastener component to the underlying curved surface.

22. The method of claim 21 wherein the article comprises a garment and the underlying curved surface is of a wearer's body.

23. The method of claim 22 wherein the garment is a diaper.

* * * * *